(12) United States Patent
Kim et al.

(10) Patent No.: US 7,275,852 B2
(45) Date of Patent: Oct. 2, 2007

(54) BACKLIGHT UNIT AND LCD DISPLAY APPARATUS HAVING THE SAME

(75) Inventors: Won-nyun Kim, Seoul (KR); You-sub Lee, Gunpo-si (KR); Ji-whan Noh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 81 days.

(21) Appl. No.: 11/023,346

(22) Filed: Dec. 29, 2004

(65) Prior Publication Data

US 2006/0104080 A1 May 18, 2006

(30) Foreign Application Priority Data

Nov. 17, 2004 (KR) ...................... 10-2004-0093880

(51) Int. Cl.
*F21V 7/04* (2006.01)
(52) U.S. Cl. ...................... 362/612; 362/609
(58) Field of Classification Search ............... 362/612, 362/609
See application file for complete search history.

(56) References Cited

U.S. PATENT DOCUMENTS

| | | | | |
|---|---|---|---|---|
| 6,812,976 B2* | 11/2004 | Satonaka | ...................... | 349/58 |
| 6,846,089 B2* | 1/2005 | Stevenson et al. | ........... | 362/627 |
| 7,059,757 B2* | 6/2006 | Shimizu | ...................... | 362/580 |
| 2002/0113534 A1* | 8/2002 | Hayashi et al. | ............. | 313/113 |
| 2004/0136155 A1* | 7/2004 | Onishi et al. | ............... | 361/683 |
| 2005/0122707 A1* | 6/2005 | Kim | ............................ | 362/29 |

FOREIGN PATENT DOCUMENTS

| | | |
|---|---|---|
| JP | 09-197401 | 7/1997 |
| JP | 8-136918 | 5/1998 |
| JP | 2000-187446 | 7/2000 |
| JP | 2001-174808 | 6/2001 |
| JP | 2001-283624 | 10/2001 |
| JP | 2003-331604 | 11/2003 |
| KR | 2000-25141 | 5/2000 |
| KR | 20-228373 | 4/2001 |
| KR | 2003-79599 | 10/2003 |
| KR | 2004-82132 | 9/2004 |

OTHER PUBLICATIONS

Korean Office Action issued in corresponding Korean Patent Application No. 2004-36499.
International Search Report issued on Oct. 14, 2005 in the corresponding International application.

* cited by examiner

*Primary Examiner*—Sandra O'Shea
*Assistant Examiner*—William J Carter
(74) *Attorney, Agent, or Firm*—Stanzione & Kim, LLP (57) ABSTRACT

A backlight unit including an LED module including a plurality of LEDs emitting light, and an LED substrate supporting and driving the plurality of LEDs, a diffusion sheet placed over the LED module and diffusing light emitted from the LED module, an optical sheet placed over the diffusion sheet, a module supporter placed on a back of the LED module and supporting the LED module, a chassis assembly supporting the module supporter and the diffusion sheet, and a plurality of support pins supporting the diffusion sheet and the optical sheet against the chassis assembly. Thus, a backlight unit having an improved structure in assembling efficiency is provided.

29 Claims, 6 Drawing Sheets

BACKLIGHT UNIT AND LCD DISPLAY APPARATUS HAVING THE SAME

CROSS-REFERENCE TO RELATED APPLICATIONS

This application claims the benefit under 35 U.S.C. §119 (a)-(d) of Korean Patent Application No. 2004-93880, filed on Nov. 17, 2004, in the Korean Intellectual Property Office, the disclosure of which is incorporated herein in its entirety and by reference.

BACKGROUND OF THE INVENTION

1. Field of the Invention

The present general inventive concept relates to a backlight unit, and more particularly, to a backlight unit employing a light emitting diode (LED) module as a light source.

2. Description of the Related Art

Generally, a backlight unit is placed in a back of a liquid crystal display (LCD) panel and emits light toward the LCD panel. There has recently been developed a backlight unit employing an LED as a light source.

As the backlight unit employing the LED as the light source, there is an LCD backlight unit disclosed in Korean Utility Model No. 1995-33088. Such a conventional backlight unit comprises a diffusion sheet to scatter and diffuse light, a frame placed in a back and an edge of the diffusion sheet, an LCD driving printed circuit board (PCB) placed behind the frame, and an LED chip coupled to the LCD driving PCB and inserted into a plurality of holes formed on the frame to emit light toward the diffusion sheet.

However, it is inconvenient to process and assemble the frame of the conventional backlight as described above because the LED chip is coupled to the LCD driving PCB and inserted into the plurality of holes formed on the frame.

SUMMARY OF THE INVENTION

Accordingly, it is an aspect of the present general inventive concept to provide a backlight unit having an improved structure in assembling efficiency.

Additional aspects and advantages of the present general inventive concept will be set forth in part in the description which follows and, in part, will be obvious from the description, or may be learned by practice of the general inventive concept.

The foregoing and/or other aspects of the present general inventive concept are achieved by providing a backlight unit including an LED module comprising a plurality of LEDs emitting light, and an LED substrate supporting and driving the plurality of LEDs; a diffusion sheet placed over the LED module and diffusing light emitted from the LED module; an optical sheet placed over the diffusion sheet; a module supporter placed on a back of the LED module and supporting the LED module; a chassis assembly supporting the module supporter and the diffusion sheet; and a plurality of support pins supporting the diffusion sheet and the optical sheet against the chassis assembly.

The chassis assembly may comprise a lower chassis comprising a base portion provided in a bottom of the module supporter and supporting the module supporter, and a side portion extending from the base portion and provided in a side of the module supporter; a middle chassis provided above the side portion and supporting the optical sheet; and an upper chassis provided in an upper side of the middle chassis and integrally coupled with the middle chassis and the lower chassis.

The backlight unit may further comprise a plurality of reflection plates slantingly provided between an edge of the diffusion sheet and an edge of the optical sheet and reflecting light coming out through a lateral between the diffusion sheet and the optical sheet.

Each reflection plate may be formed with at least one protrusion, and the lower chassis may be formed with a protrusion holder to hold the protrusion.

The diffusion sheet may be inserted and supported between a bottom of the reflection plate and a diffusion sheet supporter bent from the side portion, and the optical sheet may be inserted and supported between a top of the reflection plate and the middle chassis.

The reflection sheet may be formed with a plurality of first through holes to accommodate at least two of the plurality of LEDs, and returns light reflected from the diffusion sheet toward the diffusion sheet.

The support pin may comprise a diffusion sheet coupler passing through the diffusion sheet and supporting the diffusion sheet, an optical sheet supporter contacting a bottom of the optical sheet and supporting the bottom of the optical sheet, and a reflection sheet coupler passing through the reflection sheet and supporting the reflection sheet.

On the back of the chassis assembly may be formed a plurality of support pin holders to be coupled with the support pin, and the plurality of support pin holders may be symmetrically arranged with respect to a center point of the chassis assembly.

The backlight unit may further comprise an auxiliary reflection sheet placed between the reflection sheet and the LED module, formed with a plurality of second through holes to individually accommodate the LED, and returning the light reflected from the diffusion sheet toward the diffusion sheet.

The module supporter may comprise a reflection sheet supporter supporting the reflection sheet.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to like elements throughout. The embodiments are described below in order to explain the present general inventive concept while referring to the figures.

As shown in FIGS. 1 through 6, a backlight unit 1 according to an embodiment of the present general inventive concept comprises an LED module 20 placed behind an LCD panel 80 and emitting light toward the LCD panel 80; a diffusion sheet 40 placed over the LED module 20 and diffusing light emitted from the LED module 20; an optical sheet 50 placed over the diffusion sheet 40; a module supporter 25 placed on a back of the LED module 20 and supporting the LED module 20; a chassis assembly 10 (see FIG. 4) supporting the module supporter 25 and the diffusion sheet 40; and a plurality of support pins 60 supporting the diffusion sheet 40 and the optical sheet 50 against the chassis assembly 10. According to an embodiment of the present general inventive concept, the backlight unit 1 can further comprise a plurality of reflection plates 55 slantingly provided between an edge of the diffusion sheet 40 and an edge of the optical sheet 50 and reflecting the light coming out through a lateral direction between the diffusion sheet 40 and the optical sheet 50. The backlight unit 1 can further comprise a reflection sheet 30 interposed between the diffusion sheet 40 and the LED module 20 and returning the light reflected from the diffusion sheet 40 back toward the diffusion sheet 40.

Figure 1:
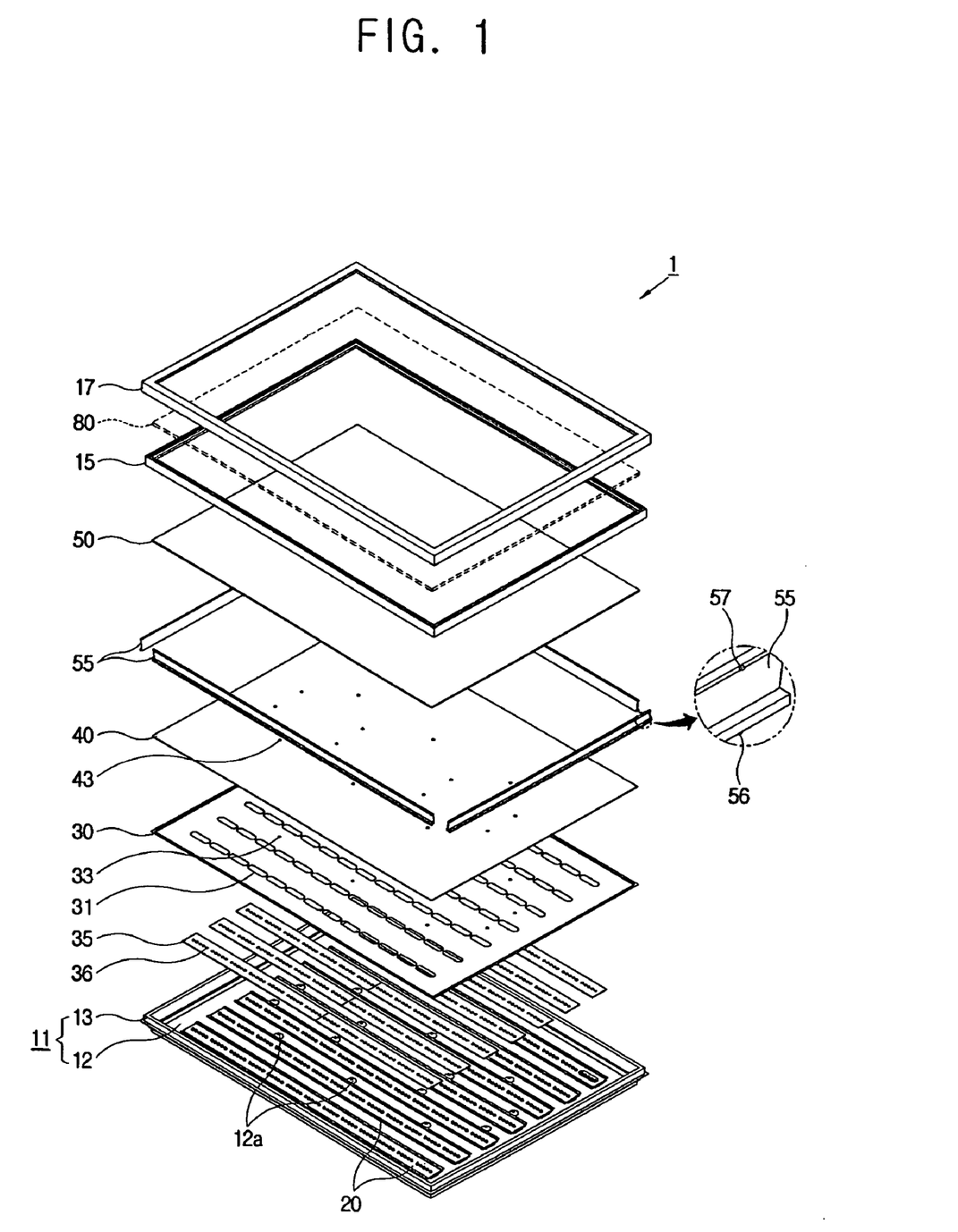
FIG. 1 is an exploded perspective view of a backlight unit according to an embodiment of the present general inventive concept.

As shown in FIG. 1, the LED modules 20 may be plurally provided, e.g., seven LED modules 20 are illustrated as being transversely arranged with respect to a lower chassis 11 of the chassis assembly 10 (to be described later). Each LED module 20 comprises a plurality of LEDs 21 to emit light, and an LED substrate 23 supporting and driving the plurality of LEDs 21 (see FIG. 2). The LED module 20 radiates heat of a high temperature as the LEDs 21 emit light, and the LED module 20 may comprise a heat pipe 71 contacting the LEDs 21 to discharge the heat.

Figure 2:
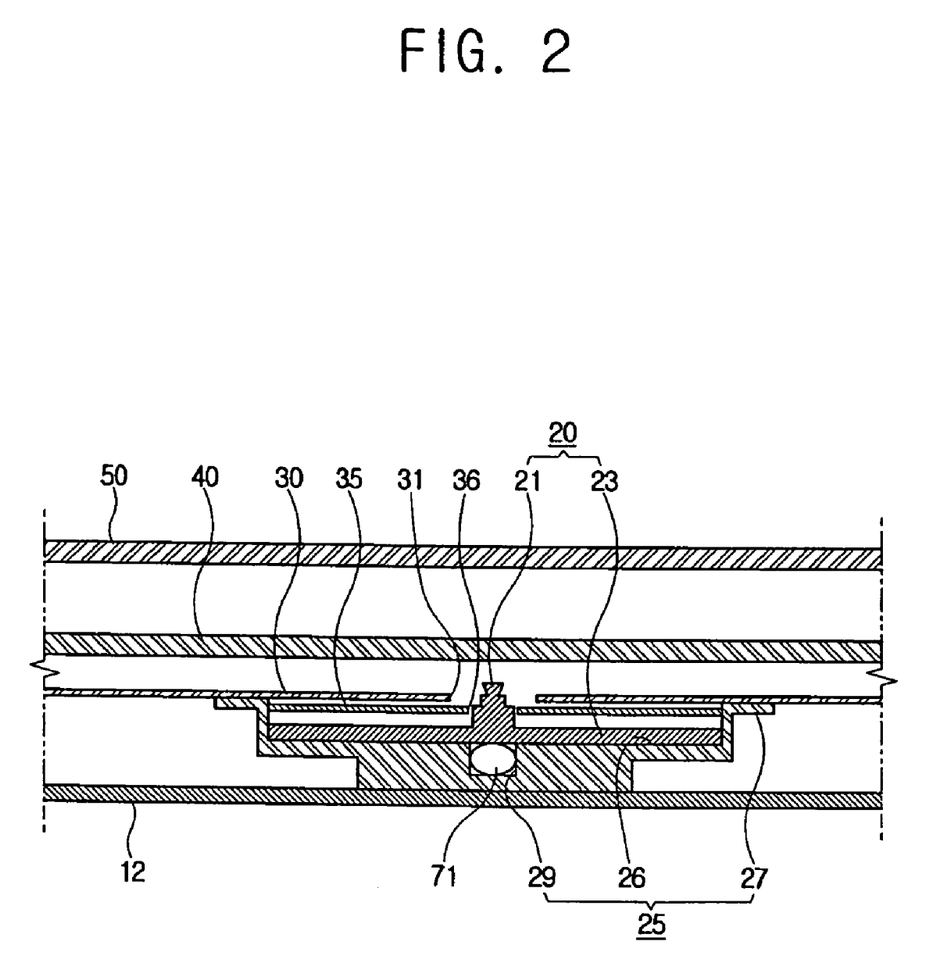
FIG. 2 is a partial section view of a light emitting diode (LED) module provided in the backlight unit, according to an embodiment of the present general inventive concept.

The plurality of LEDs 21 are mounted on the LED substrate 23, and each LED emits light having one color of red (r), green (G) and blue (B). Alternatively, each LED 21 may emit light of white or another color. Here, the plurality of LEDs 21 radiate heat of a high temperature while emitting light.

The LED substrate 23 is shaped like an elongated plate to be coupled with and support the plurality of LEDs 21, and is formed with a circuit pattern (not shown) thereon to drive the LEDs 21. On the LED substrate 23, the LEDs 21 are spaced from each other. According to an embodiment of the present general inventive concept, an interval between the LEDs 21 per five LEDs 21 is relatively wide. That is, five LEDs 21 are grouped to have equal-sized intervals. Alternatively, two through four LEDs 21, six through ten LEDs 21, or ten or more LEDs 21 can be grouped to have the equal-sized intervals. The LED substrate 23 cane be made of a material having good heat conduction to discharge heat from the LED 21, such as, for example, aluminum. Alternatively, the LED substrate 23 may be made of various materials which provide good heat conduction.

The diffusion sheet 40 is placed over the plurality of LEDs 21, and scatters and diffuses the light emitted from the LEDs 21. The diffusion sheet 40 transmits light of 20% directly emitted from the plurality of LEDs 21, and reflects the other light of 80%. Then, the light reflected from the diffusion sheet 40 is returned by the reflection sheet 30 back toward the diffusion sheet 40.

The optical sheet 50 is placed over the diffusion sheet 40, and comprises a prism sheet or the like to align an optical path of the light passing through the diffusion sheet 40.

Referring back to FIG. 1, the reflection sheet 30 is formed with a plurality of first through holes 31 to accommodate at least two of the plurality of LEDs 21. The reflection sheet 30 can be made by coating an aluminum plate with a reflective film to return the light reflected from the diffusion sheet 40 back toward the diffusion sheet 40. Alternatively, the reflection sheet 30 may be made of various materials that can return the light reflected from the diffusion sheet 40 back toward the diffusion sheet 40. Like the diffusion sheet 40, the reflection sheet 30 is formed as a single piece to entirely cover the LED module 20. Alternatively, the reflection sheet 30 may be formed as a plurality of pieces. Additionally, an auxiliary reflection sheet 35 can be provided between the reflection sheet 30 and the LED module 20.

Each first through hole 31 can be formed to pass five LEDs 21 of the LED substrate 23 therethrough. Alternatively, each first through hole 31 may be formed to pass various numbers of LEDs 21 therethrough according to the grouped LEDs 21 arranged on the LED substrate 23.

The auxiliary reflection sheet 35 is placed between the reflection sheet 30 and the LED module 20 and is formed with a plurality of second through holes 36 to individually accommodate the LEDs 21, thereby returning the light reflected from the diffusion sheet 40 back toward the diffusion sheet 40. That is, the auxiliary reflection sheet 35 is provided between the LEDs 21 and reflects the light not being not reflected by the reflection sheet 30. The auxiliary reflection sheet 35 can be formed as a plurality of pieces corresponding to the number of LED modules 20. The auxiliary reflection sheet 35 is provided between the LED substrate 23 and the reflection sheet 30 and can be made of an insulating material to cut off electric current flowing from the LED substrate 23 to the reflection sheet 30. Here, the auxiliary reflection sheet 35 can be accommodated between reflection sheet supporters 27 of the module supporter 25.

The module supporter 25 comprises a module accommodator 26 accommodating and supporting the LED module 20, and the reflection sheet supporter 27 contacting and supporting a back of the reflection sheet 30. Here, the module supporter 25 is formed as a plurality pieces corresponding to the number of LED modules 20. Further, each module supporter 25 is formed with a heat pipe accommodator 29 accommodating and supporting the heat pipe 71 to allow the heat pipe 71 to closely contact the LED module 20. According to an embodiment of the present general inventive concept, the module supporter 25 is made of material having good heat conduction to easily discharge heat generated from the LED module 20. Preferably, the module supporter 25 is made of aluminum. Alternatively, the module supporter 25 may be made of various other materials which have good heat conduction.

The reflection sheet supporters 27 extend from opposite sides of the module accommodator 26 in parallel with the reflection sheet 30, thereby contacting the back of the reflection sheet 30.

The heat pipe accommodator 29 is recessed on the module accommodator 26 to accommodate the heat pipe 71. Here, the heat pipe accommodator 29 is longitudinally formed along a lengthwise direction of the module accommodator 26.

According to an embodiment of the present general inventive concept, the heat pipe 71 is shaped like a tube and made of a material having good conduction. Here, the heat pipe 71 is filled with fluid therein and then sealed.

Figure 4:
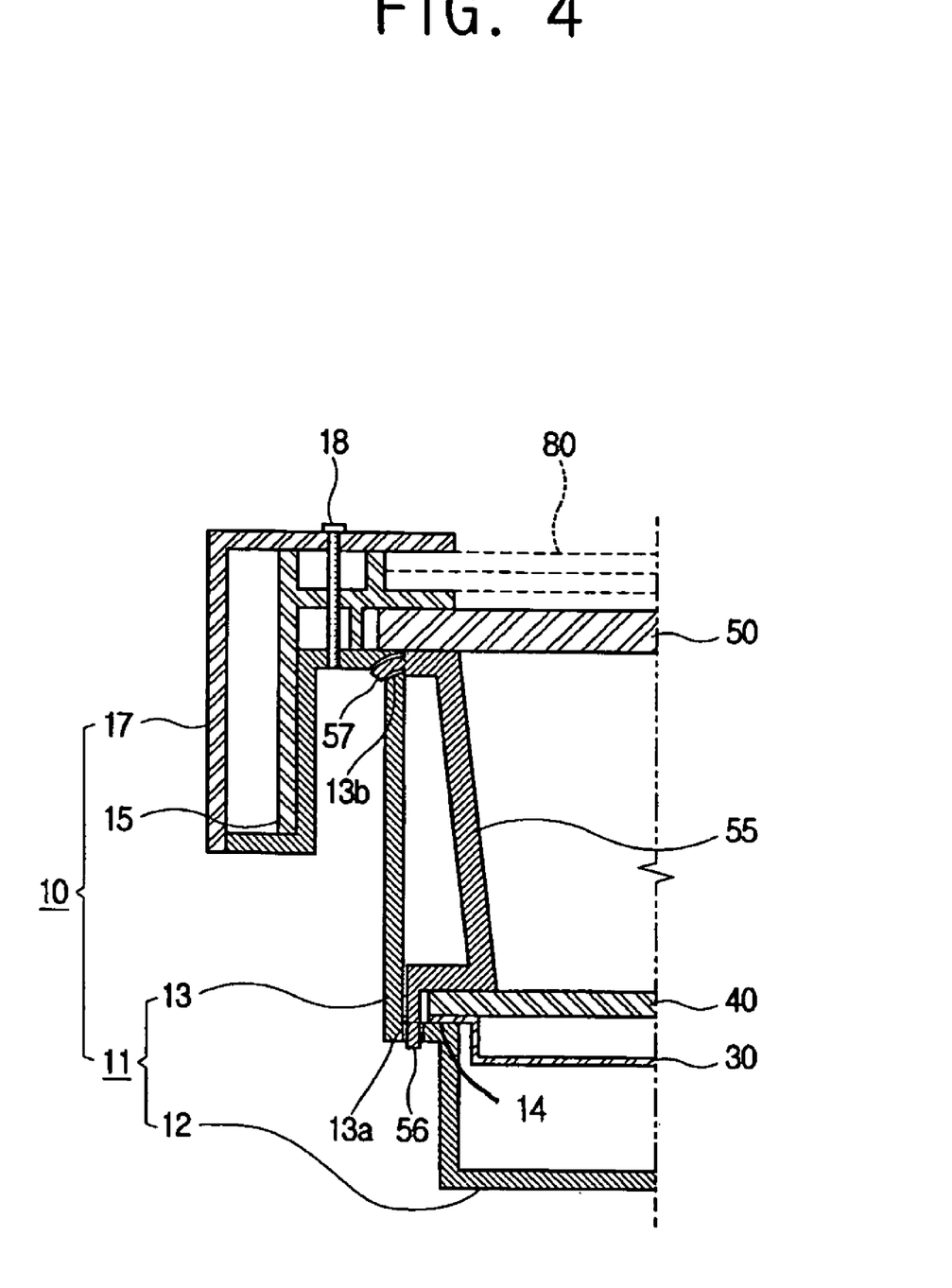
FIG. 4 is a partial section view of a chassis assembly provided in the backlight unit according to an embodiment of the present general inventive concept.

The reflection plate 55 may be provided as four pieces corresponding to four edges of both the diffusion sheet 40 and the optical sheet 50. The reflection plate pieces 55 reflect the light toward the edges of the optical sheet 50 to prevent the edges of the optical sheet 50 from being relatively darkened. Here, the reflection plate pieces 55 are slanted in consideration of the array of the LEDs 21. That is, the closer the LED 21 comes near the reflection plate 55, the further an inclination angle of the reflection plate 55 is increased with respect to a vertical direction. On the other hand, the more the LED 21 is away from the reflection plate 55, the more the inclination angle of the reflection plate 55 is decreased with respect to the vertical direction. As illustrated in FIG. 4, each reflection plate 55 is formed with at least one protrusion 56 and 57, and the lower chassis 11 is formed with protrusion holders 13a and 13b to hold the protrusions 56 and 57. Each reflection plate 55 is formed with at least one protrusion 56 and 57, and the lower chassis 11 is formed with first and second protrusion holders 13a and 13b to hold the protrusions 56 and 57. The reflection plate 55 has a lower surface being in contact with an upper edge of the diffusion sheet 40, and an upper surface being in contact with a lower edge of the optical sheet 50.

The protrusions 56 and 57 comprise at least one first protrusion 56 protruding from a lower portion of each reflection plate 55 and inserted in the first protrusion holder 13a formed in a side portion 13 of the lower chassis 11, and at least one second protrusion 57 protruding from an upper portion of each reflection plate 55 and inserted in the second protrusion holder 13b formed in a side portion 13 of the lower chassis 11. Thus, the first and second protrusions 56 and 57 are inserted into the first and second protrusion holders 13a and 13b, respectively, so that each reflection plate 55 can be readily coupled to the chassis assembly 10.

Figure 5:
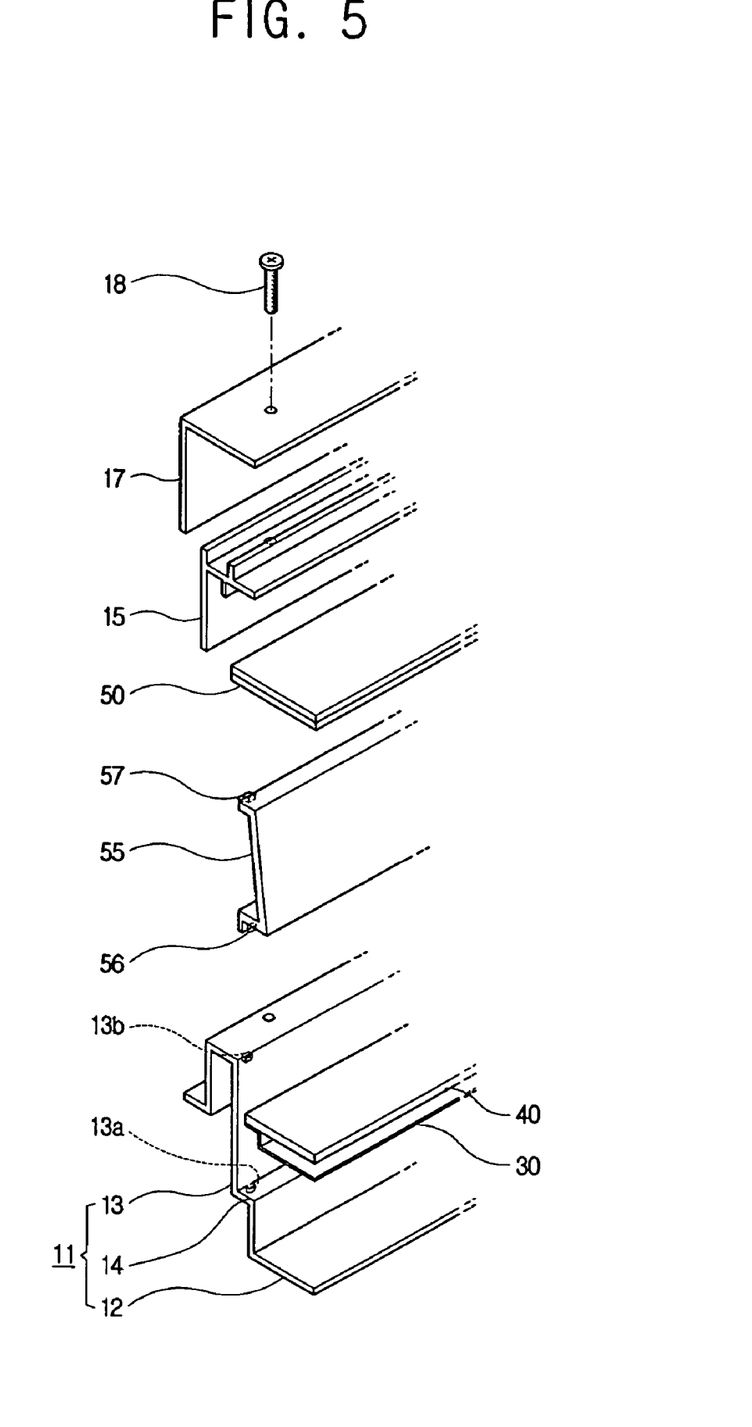
FIG. 5 is a partially exploded perspective view of the chassis assembly provided in the backlight unit according to an embodiment of the present general inventive concept.

As illustrated in, for example, FIGS. 1 and 5, the chassis assembly 10 may comprise the lower chassis 11 extending sideways from the module supporter 25 and supporting the module supporter 25, a middle chassis 15 provided in a lateral upper side of the lower chassis 11 and supporting the optical sheet 50, and an upper chassis 17 provided in an upper side of the middle chassis 15 and integrally coupled with the middle chassis 15 and the lower chassis 11.

The lower chassis 11 comprises a base portion 12 provided in a bottom of the module supporter 25 and supporting the module supporter 25, and the side portion 13 extending from the base portion 12 and provided in a side of the module supporter 25. The lower chassis 11 may be made of a material having good heat conduction to discharge heat from the LED module 20, such as, for example, aluminum. Alternatively, the lower chassis 11 may be made of various other materials that have good heat conduction.

The base portion 12 is shaped like a rectangular plate and is compactly coupled with the module supporter 25. Further, the base portion 12 is formed with a plurality of support pin holders 12a to hold the support pins 60.

Figure 6:
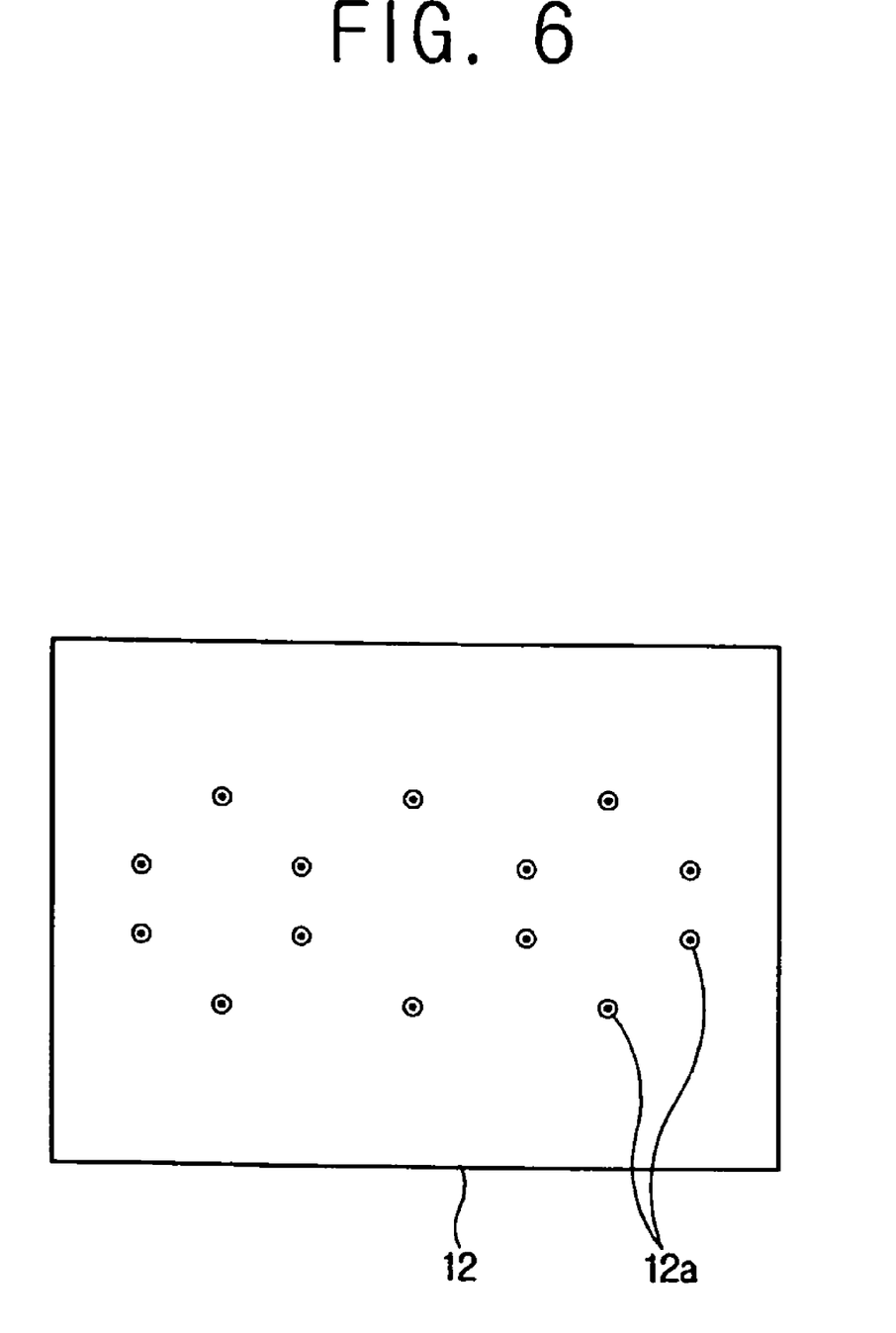
FIG. 6 is a rear view of the chassis assembly provided in the backlight unit according to an embodiment of the present general inventive concept.

The support pin holders 12a are upwardly recessed on the base portion 12 placed between the module supporters 25, and are penetrated to be coupled with respective support pins 60. As shown in FIG. 6, the plurality of support pin holders 12a are symmetrically arranged with respect to a center point of the base portion 12. Alternatively, the plurality of support pin holders 12a may be symmetrically arranged with respect to a vertical or horizontal center line of the base portion 12.

As illustrated in, for example, FIG. 4, the side portion 13 extends upwardly from the base portion 12 and is bent to have an inversed "U"-shape. The side portion 13 comprises the first and second protrusion holders 13a and 13b to accommodate and support the first and second protrusions 56 and 57 of the reflection plate 55, and a diffusion sheet supporter 14 being bent to support the edge of the diffusion sheet 40.

The diffusion sheet supporter 14 is bent from the side portion 13 to support the lower edge of the diffusion sheet 40. Thus, the diffusion sheet 40 can be inserted and supported between the bottom of the reflection plate 55 and the diffusion sheet supporter 14. Further, the edge of the reflection sheet 30 can be inserted and supported between the bottom of the reflection plate 55 and the diffusion sheet supporter 14 (referring to FIG. 4).

The middle chassis 15 is placed above the side portion 13 to be in contact with the upper edge of the optical sheet 50. The middle chassis 15, together with the top of the reflection plate 55, supports the optical sheet 50. Thus, the optical sheet 50 is inserted and supported between the top of the reflection plate 55 and the middle chassis 15.

The upper chassis 17 is placed above the middle chassis 15 and is coupled with both the middle chassis 15 and the side portion 13 of the lower chassis 11 by a screw 18. The upper chassis 17, together with the middle chassis 15, supports the LCD panel 80.

Figure 3:
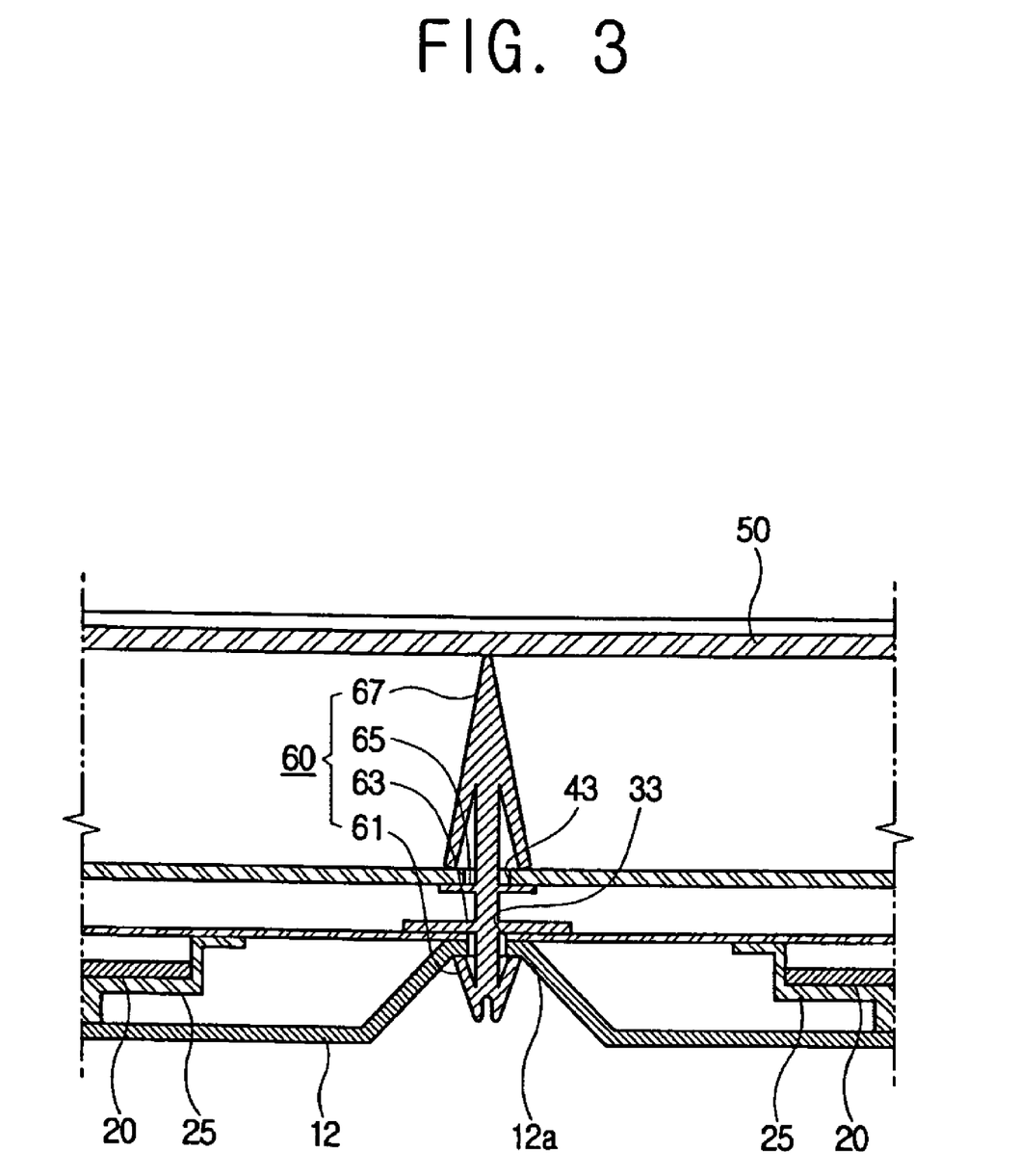
FIG. 3 is a partial section view of a support pin provided in the backlight unit according to an embodiment of the present general inventive concept.

Referring to FIG. 3, the support pin 60 comprises a diffusion sheet coupler 65 passing through the diffusion sheet 40 and supporting the diffusion sheet 40, an optical sheet supporter 67 contacting and supporting the bottom of the optical sheet 50, and a reflection sheet coupler 63 passing through the reflection sheet 30 and supporting the reflection sheet 30. The support pin 60 is formed as a plurality of pieces corresponding to the number of support pin holders 12a. Further, the support pin 60 comprises a lower chassis coupler 61 in a lower portion thereof, wherein the lower chassis coupler 61 is shaped like a hook and resiliently passes through both the first through hole 33 of the reflection sheet 30 and the support pin holder 12a, thereby being coupled to the lower chassis 11.

The reflection sheet coupler 63 is placed on the top of the reflection sheet 30 and, together with the lower chassis coupler 61, supports the reflection sheet 30 against the support pin holder 12a.

The diffusion sheet coupler 65 is placed on the bottom of the diffusion sheet 40 and, together with the optical sheet supporter 67, supports the diffusion sheet 40.

The optical sheet supporter 67 is placed in an upper portion of the support pin 60 and contact-supports the bottom of the optical sheet 50. The optical sheet supporter 67 is shaped like a hook and resiliently passes through a second fastening hole 43 formed on the diffusion sheet 40.

Thus, the reflection sheet 30 is readily coupled to the lower chassis 11 by the support pin 60. Further, the diffusion sheet 40 and the optical sheet 50 are easily supported by the support pin 60.

With this configuration, the backlight unit 1 according to an embodiment of the present general inventive concept is assembled as follows.

First, the plurality of module supporters 25 is coherently coupled to the base portion 12 of the lower chassis 11. At this time, the module supporter 25 and the base portion 12 are coupled by various methods such as an adhesive, a screw or the like. Then, the heat pipe 71 and the LED module 20 are coupled to the module supporter 25. At this time, the heat pipe 71 and the LED module 20 are coupled to the module supporter 25 by various methods such as an adhesive, a screw or the like. Then, the auxiliary reflection sheet 35 is coupled to the LED module 20, and the reflection sheet 30 is placed on the auxiliary reflection sheet 35. Then, the lower chassis coupler 61 of the support pin 60 is fastened into both the first through hole 33 of the reflection sheet 30 and the support pin holder 12a. Further, the optical sheet supporter 67 of the support pin 60 is fastened into the second fastening hole 43 of the diffusion sheet 40. Then, the reflection sheets 55 are coupled to the side portions 13 of the lower chassis 11, thereby supporting the diffusion sheet 40. Then, the optical sheet 50 is placed on the diffusion sheet 40, and the middle chassis 15 is put on the side portion 13 of the lower chassis 11, thereby supporting the edges of the optical sheet 50. Then, the upper chassis 17 is put on the middle chassis 15 and fastened with both the middle chassis 15 and the side portion 13 of the lower chassis 11 by the screw 18. Thus, the backlight unit 1 is completely assembled.

According to an embodiment of the present general inventive concept, the backlight unit comprises the module supporter placed in the back of the LED module and supporting the LED module, the chassis assembly supporting the module supporter and the diffusion sheet, the plurality of support pins supporting the diffusion sheet and the optical sheet against the chassis assembly, thereby improving the assembling As described above, the present general inventive concept provides a backlight unit having an improved structure in assembling efficiency.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A backlight unit comprising:
   an LED module comprising a plurality of light emitting diodes (LEDs), and an LED substrate supporting and driving the plurality of LEDs;
   a diffusion sheet placed over the LED module and diffusing light emitted from the LED module;
   an optical sheet placed over the diffusion sheet;
   a module supporter placed on a back of the LED module and supporting the LED module;
   a chassis assembly supporting the module supporter and the diffusion sheet;
   a plurality of support pins supporting the diffusion sheet and the optical sheet against the chassis assembly; and
   a plurality of reflection plates disposed between an edge of the diffusion sheet and an edge of the optical sheet.

2. The backlight unit according to claim 1, wherein the chassis assembly comprises:
   a lower chassis comprising a base portion provided in a bottom of the module supporter and supporting the module supporter, and a side portion extending from the base portion and provided in a side of the module supporter; and
   an upper chassis provided in an upper side of the lower chassis and coupled with the lower chassis.

3. The backlight unit according to claim 2, wherein the chassis assembly further comprises:
   a middle chassis provided above the side portion and supporting the optical sheet; and
   the upper chassis provided in an upper side of the middle chassis and integrally coupled with the middle chassis and the lower chassis.

4. The backlight unit according to claim 3, wherein the plurality of reflection plates are slantingly provided between the edge of the diffusion sheet and the edge of the optical sheet to reflect light coming out laterally between the diffusion sheet and the optical sheet.

5. The backlight unit according to claim 4, wherein each reflection plate is formed with at least one protrusion, and the lower chassis is formed with a protrusion holder to hold the protrusion.

6. The backlight unit according to claim 5, wherein the diffusion sheet is inserted and supported between a bottom of the reflection plate and a diffusion sheet supporter bent from the side portion, and
   the optical sheet is inserted and supported between a top of the reflection plate and the middle chassis.

7. The backlight unit according to claim 1, further comprising a reflection sheet formed with a plurality of first through holes to accommodate at least two of the plurality of LEDs, and returning light reflected from the diffusion sheet toward the diffusion sheet.

8. The backlight unit according to claim 7, wherein the support pin comprises a diffusion sheet coupler passing through the diffusion sheet and supporting the diffusion sheet, an optical sheet supporter contacting a bottom of the optical sheet and supporting the bottom of the optical sheet, and a reflection sheet coupler passing through the reflection sheet and supporting the reflection sheet.

9. The backlight unit according to claim 8, wherein on the back of the chassis assembly is formed a plurality of support pin holders to be coupled with the support pin, and
   the plurality of support pin holders are symmetrically arranged with respect to a center point of the chassis assembly.

10. The backlight unit according to claim 7, further comprising an auxiliary reflection sheet placed between the reflection sheet and the LED module, formed with a plurality of second through holes to individually accommodate the LED, and returning the light reflected from the diffusion sheet toward the diffusion sheet.

11. The backlight unit according to claim 7, wherein the module supporter comprises a reflection sheet supporter supporting the reflection sheet.

12. An LCD display apparatus comprising:
   an LED module including an LED substrate having a plurality of LEDs emitting light thereon;
   a diffusion sheet provided above the LED module;
   an optical sheet provided above the diffusion sheet;
   an LCD panel provided above the optical sheet;
   a chassis assembly to enclose and maintain each of the LED module, diffusion sheet, optical sheet and LCD panel being spaced apart with respect to each other; and
   a plurality of reflection plates disposed between an edge of the diffusion sheet and an edge of the optical sheet.

13. The LCD display apparatus according to claim 12, further comprising a plurality of support pins to stably support the diffusion sheet and the optical sheet within the chassis assembly.

14. The LCD display apparatus according to claim 13, further comprising a reflection sheet interposed between the diffusion sheet and the LED module to return light reflected from the diffusion sheet back toward the diffusion sheet.

15. The LCD display apparatus according to claim 14, wherein the plurality of support pins each comprise:
a lower chassis coupler to pierce and couple an outer surface of a lower portion of the chassis;
a reflection sheet coupler to couple the reflection sheet against the lower portion of the chassis;
a diffusion sheet coupler to support a bottom portion of the diffusion sheet; and
an optical sheet supporter to press the diffusion sheet again the diffusion sheet coupler and to maintain the optical sheet at the predetermined distance above the diffusion sheet.

16. The LCD display apparatus according to claim 13, wherein each of the plurality of support pins includes at least one coupler.

17. The LCD display apparatus according to claim 12, further comprising a reflection sheet interposed between the diffusion sheet and the LED module to return light reflected from the diffusion sheet back toward the diffusion sheet.

18. The LCD display apparatus according to claim 17, wherein the reflection sheet is formed with a plurality of first through holes each to accommodate a group of LEDs therein.

19. The LCD display apparatus according to claim 18, further comprising an auxiliary reflection sheet placed between the reflection sheet and the LED module and formed with a plurality of second through holes to individually accommodate the LEDs to return light reflected from the diffusion sheet back toward the diffusion sheet.

20. The LCD display apparatus according to claim 17, further comprising a heat pipe provided in the LED module and contacting the plurality of LEDs to discharge heat therefrom.

21. The LCD display apparatus according to claim 17, wherein the reflection sheet is formed as a single piece to entirely cover the LED module.

22. The LCD display apparatus according to claim 17, wherein the reflection sheet is formed as a plurality of pieces covering the LED module.

23. The LCD display apparatus according to claim 17, further comprising an auxiliary reflection sheet located between the reflection sheet and the LED module.

24. The LCD display apparatus according to claim 12, wherein the reflection plates correspond to four edges of both the diffusion sheet and the optical sheet to reflect light back towards edges of the optical sheet to prevent the edges of the optical sheet from being relatively darkened.

25. The LCD display apparatus according to claim 12, wherein the chassis assembly comprises:
a lower chassis comprising a base portion provided in a bottom of a module supporter and supporting the module supporter, and a side portion extending from the base portion and provided in a side of the module supporter; and
an upper chassis provided in an upper side of the lower chassis and coupled with the lower chassis.

26. The LCD display apparatus according to claim 25, wherein the chassis assembly further comprises:
a middle chassis provided above the side portion and supporting the optical sheet; and
the upper chassis provided in an upper side of the middle chassis and integrally coupled with the middle chassis and the lower chassis.

27. The LCD display apparatus according to claim 12, wherein the chassis assembly includes a side portion which extends upwardly and has an inverse U-shape.

28. The LCD display apparatus according to claim 12, wherein the reflection plates include four individual reflection plates.

29. An LCD display apparatus comprising:
a light source;
a diffusion sheet provided above a reflection sheet;
reflection plates provided above the diffusion sheet;
an optical sheet provided above the reflection plates;
an LCD panel provided above the optical sheet; and
a chassis assembly to enclose the light source, diffusion sheet, reflection plates, optical sheet, and LCD panel, wherein the chassis assembly maintains the diffusion sheet and the optical sheet a distance apart approximately equal to the height of the reflection plates.

* * * * *